3,318,718
ACID TREATMENT OF CALCINED KAOLIN
John W. Beamesderfer, Orono, Maine, and Horton H. Morris, Gordon, Ga., assignors to Freeport Sulphur Company, New York, N.Y., a corporation of Delaware
Filed Feb. 21, 1966, Ser. No. 536,511
6 Claims. (Cl. 106—288)

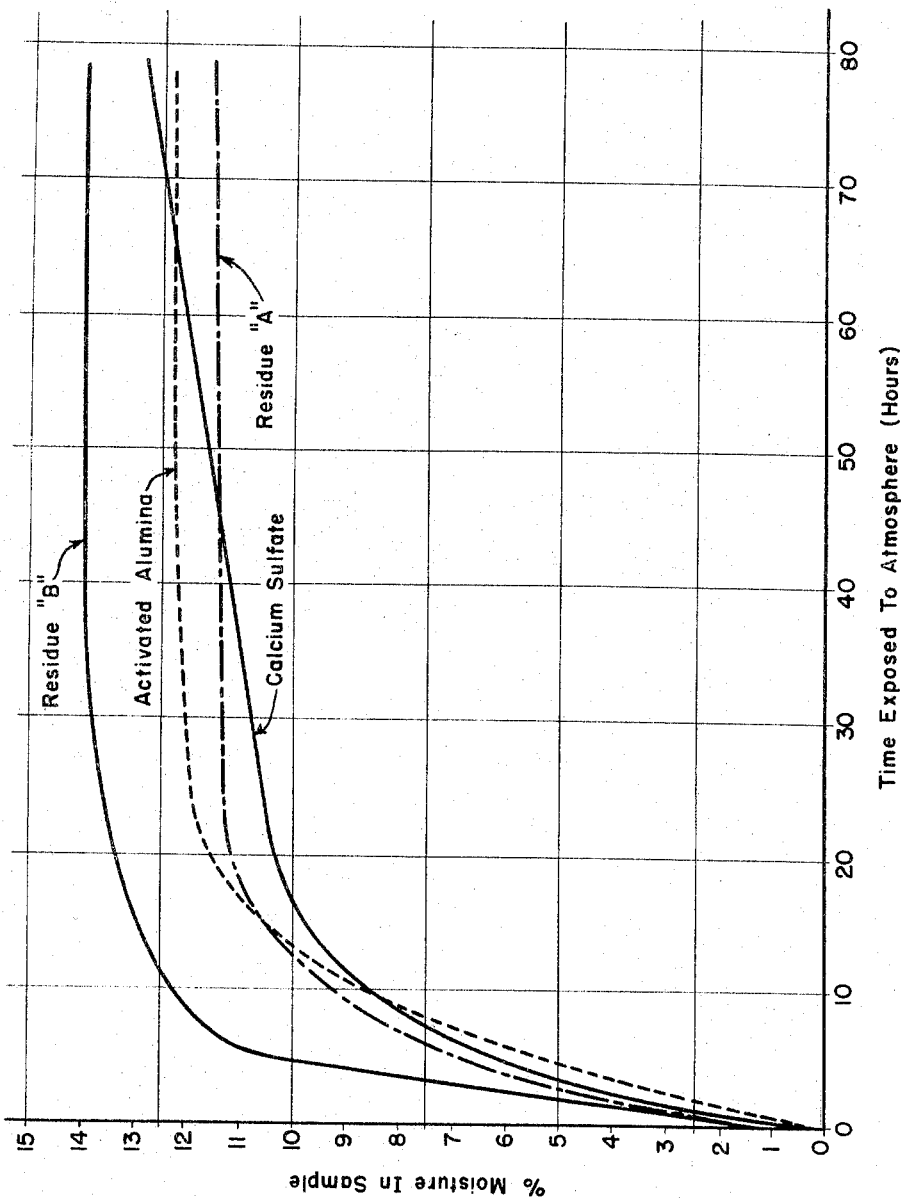

This application is a continuation-in-part of our abandoned application Ser. No. 93,434, filed Mar. 6, 1961. This latter application is a continuation-in-part application of our prior application Ser. No. 676,711, filed Aug. 7, 1957, now Patent No. 2,974,054.

This invention relates to improvements in the treatment of clay for the production of improved silica residues, and includes improved processes of treating clay and improved silica residues produced by such treatment.

The invention includes an improved silica residue produced from kaolin clay, from which the greater portion of the alumina has been extracted, but which retains a substantial amount of alumina, and which also has combined therewith a substantial amount of phosphoric acid, and which is a valuable product as a paper coating composition, and for other purposes, and which retains the characteristic platelet or booklet appearance of the clay from which it is produced. This product will hereafter be referred to as product "A."

The invention also includes a silica product in a highly purified form, freed from most or all of the alumina and phosphate of product "A," but retaining the hexagonal platelet appearance of kaolin clay, even though X-ray diffraction shows the material to be amorphous. This product will hereafter be referred to as product "B."

The clay which is treated to produce the new silica residues is clay such as Georgia kaolin clay, of the kind commonly known as coating clays or filling clays, or run-of-mine clays, which are obtained after first separating the sand and grit and coarser particles from the mined and kilned clay. In the production of domestic coating clays, used extensively in the paper industry, the Georgia kaolin clays are subjected to settling and separation treatments to produce coarser and finer fractions, and the coating clay will contain around 80% to 90% of particles less than 2 microns in size, which are largely in the form of platelets, together with varying amounts of particles of larger size in the form of aggregates or booklets. The coarser or filling clay fractions of clay so separated are made up principally or largely of booklets or aggregates of fine clay platelets, with varying amounts of clay platelets of less than 2 microns in particle size. These coarser or filling clays may thus be made up largely or mainly of larger particles in the form of aggregates or booklets of over 5 microns in size and may, to some extent, contain particles exceeding 10 microns in size, and may contain, for example, 54% below 5 microns and 100% below 20 microns, and 25% below 2 microns.

In the treatment of clay according to the present invention, the clay, which may be run-of-mine clay or clay which has been produced by fractionation, such as coating clay or filling clay, is first subjected to calcining within the temperature range of 930°–1650° F. (about 500°–900° C.) and the calcined clay is then treated with dilute phosphoric acid, or with a mixture of dilute phosphoric and sulphuric acids, to extract the greater part of the alumina as aluminum phosphate, or a mixture of aluminum phosphate and aluminum sulfate, and to produce a silica residue in platelet or booklet or mixed platelet and booklet form, which still contains a substantial portion of the alumina and a substantial amount of phosphoric acid in combined form, this product being the product referred to as product "A."

The solution of aluminum phosphate, or of aluminum phosphate and aluminum sulfate, so produced, is largely separated from the silica residue and can advantageously be used for the production of composite phosphate, or phosphate-sulfate, pigments, as described and claimed in our application Ser. No. 676,711, filed Aug. 7, 1957, now Patent No. 2,974,054.

We have found that clays which have been previously calcined, within the range above indicated, can readily be treated with dilute phosphoric acid, or a mixture of dilute phosphoric acid and dilute sulfuric acid, to extract the greater part of the alumina therefrom and to produce an improved silica residue, made up mainly of silica, but still containing substantial amounts of alumina and phosphate, or of aluminum and phosphorous compounds, therein; and that the use of such dilute acids has advantages over the use of concentrated acids for such extraction and for the production of such silica residues. An excess, but not a large excess, of the dilute acid is required to keep the dissolved aluminum salts in solution to the desired extent, and the excess acid is recovered directly as a part of the solution except for such amount as remains combined in the silica residue.

When dilute phosphoric acid is used to extract the greater portion of the alumina from the calcined clay, the silica residue will be separated from the solution of aluminum phosphate but will retain substantial amounts of both aluminum and phosphate in combined form as aluminum phosphate or other aluminum-phosphorus compounds. When a mixture of dilute phosphoric and sulfuric acids is used, the amount of dilute phosphoric acid is equal to or approximately equal to the amount theoretically required to produce aluminum phosphate with the alumina of the clay, and the sulfuric acid is used as the excess amount of acid required for keeping the desired amount of the aluminum phosphate in solution, while leaving some of the aluminum phosphate in the silica residue.

The strength of the dilute phosphoric acid, or of the dilute phosphoric and sulfuric acids, used for extracting the greater portion of the alumina from the calcined clay, can vary somewhat, e.g., between about 20% and about 50% and more advantageously about 25%–30%. One advantage of the use of dilute acids for the extraction of the greater portion of the alumina from the clay is that the resulting acid solution containing dissolved aluminum can be readily separated from the silica residue and the silica residue can then be further washed to free it to the desired extent from adhering soluble aluminum salts while nevertheless leaving in the silica residue a substantial amount of alumina and phosphoric acid in a combined form.

The extraction of the clay with dilute acid is advantageously carried out at an elevated temperature and by the use of apparatus which is resistant to the action of the dilute acid at elevated temperatures, such as a glass-lined reactor.

The silica residue remaining after the extraction of the greater portion of the alumina from the calcined clay by the dilute acid treatment is a valuable silica residue. It retains the hexagonal platelet appearance, or the booklet appearance, or mixed platelet and booklet appearance, of the kaolin clay from which it is produced, even though X-ray diffraction shows the material to be amorphous. It still retains a small but substantial part of the original alumina content of the clay, together with phosphate which is present in the residue in an adsorbed or combined form, as an aluminum phosphate or a more complex form.

Where the silica residue "A" is produced by the treatment of coating clay fractions which contain the clay largely as platelets, together with a considerable amount of aggregates or booklets, the improved silica residue will retain the hexagonal platelet appearance of the platelets of the original clay, together with agglomerates or booklets, but may be somewhat finer in overall particle size than the clay treated.

Where the clay treated is a coarser clay, such as a run-of-mine clay, or coarser domestic clay fractions, made up largely of booklets or aggregates of fine clay particles together with smaller amounts of particles below 2 microns, the silica residue largely retains the form of agglomerates or booklets of the hexagonal platelets admixed with smaller amounts of hexagonal platelets, but in general will be of a somewhat smaller average particle size than the coarse clay treated.

The silica residue "A" remaining after the extraction of the greater part of the alumina from the calcined clay, and containing substantial amounts of alumina and phosphoric acid combined therewith, consists essentially of silica having a plate-like structure, or booklet-like structure, or mixed booklet and platelet-like structure, similar to that of the kaolin clay treated, with a high surface area and a particle size distribution similar to or somewhat smaller than that of the clay starting material, and it is of an acid nature. Small amounts of undissolved clay or partially dissolved clay may be present in this silica product. The properties of this acid product make it a valuable material for use as a bleaching earth. Because of the acid nature of this silica product, it can be used e.g. as an acid bleaching earth for bleaching oils and other materials, in place of bleaching clays or other bleaching earths.

This acid silica product can also be used to advantage as a filler for addition to paper pulp, e.g., in the beater where its acid properties are taken advantage of in neutralizing the alkaline compounds present in the pulp and in furnishing a filling pigment to the resulting paper.

The acid silica product produced by the process is not, because of its acid nature, suitable for use as a coating pigment. But by treating this acid silica product with a base such as ammonium hydroxide or sodium hydroxide to neutralize the acid, and by removing the resulting salt by washing, a silica product of a somewhat different nature and having an alkaline surface, rather than an acid surface, is produced, which can advantageously be used as a paper coating pigment.

The alumina content of the clay residue "A" will vary from e.g. around 3% or somewhat less up to around 15% or somewhat more. The phosphoric acid content contained or combined in this silica residue will vary from around 1% or somewhat less up to around 6% or somewhat more. While aluminum sulfate, produced when a mixture of phosphoric and sulfuric acids is used, can readily be washed from the silica residue, so that only a trace of sulfate may be present therein, the aluminum phosphate formed is not so readily separated and washed from the silica residue. When the process is carried out on a laboratory scale and the dissolved aluminum salts are separated from the residue and the residue washed promptly, a smaller amount of alumina and phosphate remains in the product. If the reaction product containing the dissolved aluminum salts and silica residue is permitted to stand for some time, or where the reaction is carried out on a larger pilot plant or plant scale, the delay in separating the dissolved aluminum salts from the residue followed by the washing of the residue tends to leave a considerably larger amount of alumina and phosphate combined in the silica residue. Phosphate analyses of several residues produced by the combined use of phosphoric and sulfuric acids have shown an amount of phosphoric acid, expressed as percentage of $P_2O_5$, varying from around 0.32% up to around 6%. The phosphate content of the residue after drying is advantageously around 1% or more.

The form in which the unextracted alumina and the phosphoric acid are present in the silica residue is difficult to determine. They appear to be present largely as aluminum phosphate, but may be present as more complex compounds of silicon, aluminum and phosphorous or as adsorption complexes. Whatever the form in which the aluminum and phosphorus are present, the clay residue retains the hexagonal platelet and booklet appearance of the clay.

The extraction of a large part of the alumina from the calcined clay, while retaining substantially the shape and size of the original clay platelets and booklets, gives a product with a high degree of porosity. The silica in this porous extracted residue appears to retain the space relationship as that of the silica in the aluminum silicate of the clay before treatment.

This acid silica residue "A" not only contains a small portion of the original alumina content of the clay together with added phosphoric acid, but it may also contain some of the impurities of the original clay. Some of the titanium compounds present in small amount in the original clay resist extraction by dilute acid and remain in the silica residue. To the extent that titanium and other compounds such as iron compounds are soluble in the dilute acid used for extracting the alumina, they will also be removed. But titanium and other compounds which are not so extracted remain in the silica product and reduce its brightness as a pigment.

We have further found that the silica residue "A" produced as above described can advantageously be further treated with hot sulfuric acid and converted into a purified silica product of high brightness and having other valuable properties. The treatment of this silica residue "A" with hot concentrated sulfuric acid results in the removal from it of most, if not all, of the alumina which it contains, together with impurities such as titanium compounds and including phosphate compounds, and gives a purified silica residue which retains a plate-like structure similar to that of the kaolin clay treated, and with a high surface area and with a particle size distribution which, with the treatment of finer clay fractions, is similar to that of the starting clay or somewhat smaller in average particle size, and which has an acid nature. When the silica residue "A" is largely in platelet or booklet form, this further treatment with concentrated sulfuric acid breaks up the platelets or booklets to a greater or less extent, so that the particle size distribution of the resulting residue, hereafter referred to as residue "B," will, in general, be finer than that of the silica residue "A" before treatment. In this residue "B," the product will largely be made up of platelets resulting from the breaking up of the booklets or aggregates by this further treatment with concentrated sulfuric acid.

This purified silica residue "B" is itself a valuable material for use as a bleaching earth or for other purposes. This acid residue "B" can also be used as a filler for paper. It has the advantage over the residue "A" that it is more highly purified silica product and, as a pigment, gives high brightness to the paper.

By neutralizing this purified silica product "B" with a base such as ammonium hydroxide or sodium hydroxide, it can be converted into an excellent paper-making pigment of high brightness. The removal of the salts formed by neutralization, by washing, leaves the silica pigment with an alkaline surface, in contrast with the acid surface of the acid silica product before neutralization.

The acid silica residue "A," as well as the purified silica residue "B," are acid silica products which retain their acid nature even after repeated washing. When this acid surface is neutralized with alkali, the silica product is freed from its acid nature, and when the salts resulting from the neutralization are washed away, the resulting silica product has an alkaline surface in the sense that it apparently had adsorbed thereon small amounts of the alkali used for the neutralization and held even after repeated washing. The neutralized product, and particularly after the second concentrated sulfuric acid treatment, is a highly purified product of high brightness and a valuable product for use, e.g., as a paper coating pigment.

In using either residue "A" or residue "B," after neutralization, for the coating of paper, these residues are used in admixture with clay or to replace clay for the coating of paper, in accordance with the usual paper-coating procedure, and with special advantages such as those hereinafter set forth, including high pigment brightness of the coated sheet.

The new residues also have advantages for other purposes, as hereinafter described.

The invention will be further described in connection with the following examples, illustrative thereof, but it will be understood that the invention is not limited thereto. The parts are by weight.

*Example 1.*—200 parts of a Georgia kaolin coating clay that had been previously calcined for one hour at 1450° F. (788° C.) were heated for one hour at 95°–105° C. with a dilute acid mixture made by diluting 210 parts of 85% phosphoric acid and 80 parts of 98% sulfuric acid and 860 parts of water.

At the end of the reaction, the reaction mixture was cooled to 60° C. and the undissolved residue removed by filtration. The residue was washed with 600 parts of a 5% phosphoric acid solution and again filtered. After drying overnight at 160° C., 129.6 parts of silica residue were obtained.

*Example 2.*—200 parts of Georgia kaolin coating clay that had been previously calcined for one hour at 1450° F. were heated for one hour at 95°–105° C. with dilute phosphoric acid made by admixing 300 parts of 85% phosphoric acid with 860 parts of water.

The reaction mixture was then cooled to about 50° C. and the undissolved residue removed by filtration. The residue was washed with 600 parts of a 5% phosphoric acid solution and again filtered. 159.8 parts of silica residue were obtained after drying overnight at 100°–110° C.

The silica residue remaining after the extraction with dilute phosphoric and sulfuric acids, as described in Example 1, or after extracting the calcined clay with dilute phosphoric acid, as described in Example 2, is principally silica, containing some unreacted or partially reacted clay and some aluminum phosphates (or phosphates and sulfates) which are absorbed or mechanically bound on the clay or on the silica, together with some phosphoric acid (or phosphoric and sulfuric acids) and a portion of the trace impurities that were present in the calcined clays, such as small amounts of titanium ores or compounds.

This silica residue is an acidic material and has a large surface area and a plate-like structure (microscopical) and a particle size distribution similar to that of the clay treated. Its brightness is similar to or slightly better than that of the clay used as the starting material.

This silica residue is of sufficient purity to enable it to be used for various purposes, for example, as a bleaching earth, etc. Some of the impurities of the calcined clay, in so far as they are soluble in and extracted by the dilute acid treatment, are removed by that treatment. But the impurities, such as certain titanium ores or titanium-iron compounds, which are insoluble in dilute acid, remain in the acid silica product.

This acid residue, when neutralized with an alkali such as ammonium hydroxide or sodium hydroxide, and washed to remove the soluble salts formed by the neutralization, is converted into an alkaline silica residue with adsorbed alkali and is a valuable material for use, e.g., in paper coating.

*Example 3.*—The insoluble silica residue "A" produced and separated as described in Example 1, and remaining after the extraction of the aluminum with a mixture of phosphoric and sulfuric acids, was further treated to produce an improved silica product "B" by the following treatment:

480 parts of the silica residue produced as described in Example 1 were added to and stirred into 1350 parts of concentrated sulfuric acid and the mixture heated to boiling, about 250° C., and held at this temperature for half an hour. The resulting material was then allowed to cool and was then diluted by the gradual and cautious addition of 3000 parts of water. The remaining insoluble residue was a very white product and was removed from the diluted acid solution by filtration and the product so removed was washed by re-dispersion in water and again filtered. The recovery was about 90% by weight based on the weight of the silica product treated.

This treatment of the somewhat impure silica product with concentrated sulfuric acid results in the removal of impurities and particularly of those impurities which decrease the brightness of the product, such as titanium compounds or titanium-iron compounds, with the result that a purified silica pigment is obtained with high brightness, high surface area, a plate-like structure, and with a particle size distribution similar to that of the silica residue before treatment. And this improved silica product also has an acidic surface, retaining an acid surface even after repeated washing with water. And it has a very low content of impurities and is substantially free from impurities extractable by the concentrated sulfuric acid.

The improved and purified silica product produced as described in this example had G.E. brightness values ranging from 93 to 100, abrasion values ranging from 40 to 127 mg., a specific resistance in the range of 34,000 to 36,000 ohms, and pH values well on the acid side (pH 1–3). Electron micrographs showed the product to be composed of flat, plate-like particles that could not be visually distinguished from kaolinite. The particle size distribution was similar to that of a high grade coating clay. The surface area ranged from 250 to 300 square meters per gram.

This purified acid silica pigment is a valuable product for use as a bleaching earth. It is also a valuable pigment for use as a filler for paper, improving the color of the paper, and the acid of the pigment serving to neutralize part of the alkali of the paper pulp. By neutralizing this acid silica product with an alkali such as a solution of ammonium hydroxide or sodium hydroxide, and by washing the neutralized product to remove soluble salt, a highly purified alkaline silica product is obtained with an alkaline surface instead of an acid surface. Such a neutralized product is a valuable white pigment for use in the coating of paper, either alone or admixed with coating clays, giving to the coated paper an improved brightness as compared with that of the paper coated with the coating clay alone.

The process of the above example can be varied somewhat in amount of acid used and in the temperature employed, using e.g. concentrated sulfuric acid at a temperature of 200° to 300° C. for varying periods of time up to about one hour and removing the remaining undissolved silica residue from the acid containing the soluble materials extracted from the residue by the concentrated sulfuric acid treatment.

*Example 4 (production of residue "A").*—150 parts of coarse Georgia kaolin that had previously been calcined for one hour at 1300° F. were dispersed in 400 parts of water. To this clay-water slurry was added a mixture consisting of 157 parts 85% phosphoric acid and 60 parts 98% sulfuric acid. The mixture was heated to about 100° C. when an exothermic reaction took place. After completion of the exothermic reaction, the reaction mixture was held at 102°–105° C. for about two hours and then filtered while still hot. The filter cake was washed with a small quantity of hot water. The residue was dried and its properties examined. It had the following chemical analysis: ignition loss 13.3%; silica ($SiO_2$) 62.9%; alumina ($Al_2O_3$) 16.1%; phosphorous pentoxide ($P_2O_5$) 6.2%; titanium dioxide ($TiO_2$) 1.7%; ferric oxide ($Fe_2O_3$) 0.3%.

A spectrographic analysis for trace elements showed the following: barium, less than 0.01%; magnesium 0.005 to 0.05%; nickel 0.003 to 0.03%; bismuth 0.002 to 0.02% calcium 0.006 to 0.06%; copper 0.003 to 0.03%; zirconium 0.005 to 0.05%.

*Example 5 (production of residue "A").*—150 parts of a kaolin that had been calcined at 1300° F. were dispersed in 220 parts of water. This slurry was heated to 90° C. and a mixture of 60 parts 98% sulfuric acid and 161 parts 85% phosphoric acid was added. Heat was liberated and the temperature of the reaction mixture rose to 110° C. Heat was applied to hold the mixture at this temperature for one hour, 130 parts of water added and the residue filtered out of the hot solution. The residue was washed with a small quantity of hot water while still on the filter and dried.

After drying, two portions of the residue were taken, the first portion washed extensively with cold water and the second washed extensively with hot water. Some of the properties of this material are described below.

CHEMICAL ANALYSIS (AFTER ONE HOUR IGNITION AT 1000° C.)

| Components | Samples | |
|---|---|---|
| | Cold water washed, percent | Hot water washed, percent |
| Silica ($SiO_2$) | 73.3 | 73.6 |
| Alumina ($Al_2O_3$) | 17.1 | 18.4 |
| Ferric Oxide ($Fe_2O_3$) | 0.20 | 0.19 |
| Titanium Dioxide ($TiO_2$) | 1.5 | 1.8 |
| Phosphorous Pentoxide ($P_2O_5$) | 4.0 | 3.4 |
| Sulfate ($SO_3$) | Trace | |

*Example 6 (production of residue "A").*— Two residue samples prepared as described in the first paragraph of Example 5 were examined. Sample 1 was obtained by filtering off the dissolved aluminum salts at once after the reaction. Sample 2 was obtained by filtering off the aluminum salts after one and one-half hours. A summary of their properties follows:

CHEMICAL ANALYSIS

| Component | Sample 1 | Sample 2 |
|---|---|---|
| Ignition Loss (One hour at 1,000° C.) | 8.6 | 12.0 |
| Silica ($SiO_2$) | *79.9 | *66.8 |
| Alumina ($Al_2O_3$) | *13.0 | *20.9 |
| Titania ($TiO_2$) | *1.3 | *0.4 |
| Ferric Oxide ($Fe_2O_3$) | *0.1 | *0.2 |
| Phosphorous Pentoxide ($P_2O_5$) | *1.0 | *5.8 |
| Sulfate ($SO_3$) | *0.1 | *0.1 |

*Based on 1,000° C. ignited samples.

*Cation exchange capacity.*—Both samples were titrated to a pH of 7.0 with sodium hydroxide. Sample 1 required 23.2 meq. NaOH per 100 gms. while Sample 2 required 58.7 meq. NaOH per 100 gms.

Both samples were treated with a three normal neutral ammonium acetate solution. After washing, the amount of ammonia picked up by both samples was measured. Sample 1 picked-up (exchanged) 33.3 meq./100 g. while Sample 2 picked-up 63.8 meq./100 g.

Kaolin normally has a cation exchange capacity in the range of five to 15 millequivalents per 100 gms. These data show that the "A" residue has appreciably increased its cation exchange capacity.

*Example 7 (production of residue "B").*—480 parts of the "A" residue, prepared as described in the first paragraph of Example 5, were stirred with 1350 parts of 98% sulfuric acid, the mixture was heated to boiling and held at this temperature for one-half hour. The material was allowed to cool and then diluted with 3000 parts of water. The very white residue product was removed by filtration. The product was washed by redispersion in water and again filtered. Recovery was about 90% based on the weight of the "A" residue. Products from several such runs had G.E. brightness values ranging from 93 to 100, abrasion values ranging from 40 to 127 mg., specific resistance in the range 34,000–36,000 ohms. and pH values well on the acid side (pH 1–3). Electron micrographs showed the product to be composed of flat, hexagonal plate-like particles that could not be visually distinguished from kaolinite, The particle size distribution was similar to that of a high grade coating clay. The surface area ranged from 250 to 300 m.$^2$/gm.

A product similar to the one above can be obtained by moistening the residue as prepared by the method of the first paragraph of Example 5 with 98% sulfuric acid (two parts acid to one part residue "A") and baking the cake so formed at 200–300° C. for about one hour. The cake is then dispersed in water and washed as above.

The "B" residue when neutralized by treatment with a base and washed free of soluble salts, was transformed into an excellent paper coating pigment. The characteristics of the material are compared with a Georgia coating clay in the table below.

| | Coating Clay | "B" Residue |
|---|---|---|
| G.E. Brightness | 86.2 | 93.5 |
| pH | 7.2 | 5.9 |
| Moisture, percent | 4.0 | 1.8 |
| Gloss (Reg. Rubout) | 17.5 | 13.0 |
| Sheet G.E. Brightness (Reg. Rubout) | 79.2 | 89.9 |
| Abrasion, mg | 9.0 | 65 |
| Coating Characteristics, Casein Viscosity: | | |
| 150 g. wt., sec | 7.8 | 6.8 |
| 100 g. wt., sec | 10.4 | 9.0 |
| 50 g. wt., sec | 17.2 | 13.6 |
| Percent Solids | 34.0 | 32.0 |
| Coating wt., lbs | 12.0 | 12.0 |
| Gloss (Warren rubouts) | 11.5 | 12.5 |
| G.E. Brightness (Warren rubout) | 80.3 | 85.4 |

This example shows the characteristics of a paper coating made from the neutralized "B" residue as compared to a coating clay. The significant advantages of the "B" residue are its exceptionally high pigment brightness and the sheet brightness of regular and Warren rubouts.

*Example 8 (production of residue "B").*—an "A" residue, prepared as described in the first paragraph of Example 5 was treated with concentrated sulfuric acid to form the bright "B" residue. This residue was washed with distilled water until the washings no longer showed the presence of sulfate. It showed the following properties:

*Exchange capacity.*—A dried sample of this residue had a cation exchange capacity of 221.6 meq./100 gms. when titrated with sodium hydroxide to a pH of 7.0. The ammonia exchange capacity of this "B" residue was determined by treatment with neutral ammonium acetate to 215.4 meq./100 gm.

The exchange capacity of this "B" residue was determined for several different ions by a different method and the following results were obtained.

| Ion (as chloride): | Capacity |
|---|---|
| Sodium | 169, 168 |
| Potassium | 149 |
| Ammonium | 149 |

*Drying efficiency.*—A comparison of this "B" residue and a commercial drying agent (Drierite, a calcium sulfate) was made at 75% relative humidity to determine the relative drying efficiencies of the two materials.

| Time of drying (hrs.) | Percent Moisture in drying agent | |
|---|---|---|
| | "Drierite" (percent) | Residue "B" (percent) |
| ½ | 0.80 | 1.13 |
| 1½ | 2.31 | 3.15 |
| 3½ | 4.82 | 6.31 |
| 5½ | 6.67 | 8.62 |
| 93 | 13.9 | 13.1 |
| 167 | 18.0 | 13.7 |
| 193 | 19.6 | 13.8 |

A comparison of this "B" residue and another commercial drying agent, an activated alumina, was made at 6% relative humidity. After exposing both samples to this low relative humidity atmosphere for sufficient time to attain equilibrium, the "B" residue contained 6.0% water while the activated alumina contained 3.5% water.

The drying efficiency data show that the "B" residue has a faster rate of water pick-up than a commercial drying agent. The ultimate moisture capacity of the "Drierite" is greater than that of the "B" residue, but the "B" residue has a faster rate of water pick-up.

*Example 9 (tests of residue "A").*—An "A" residue sample, prepared as described in the first paragraph of Example 5, was dried and then exposed to the laboratory atmosphere for several hours. The residue was then heated at several temperatures and its weight loss measured.

Loss of adsorbed water:

Temperature of heating, ° C.: Wt. loss (percent)
  110 _____ 9.3
  200 _____ 11.7
  300 _____ 12.7
  450 _____ 13.6
  600 _____ 14.4
  800 _____ 15.2
  1000 _____ 15.4

After each sample was given the above heat treatment, the samples were exposed to a 75% relative humidity atmosphere and the percentage of the original loss in weight that was regained (water pick-up) was measured.

Drying efficiency:

Temp. of heat, ° C.    Percent of wt. loss regained
  110 _____ 104
  200 _____ 98
  300 _____ 90.6
  450 _____ 72.8
  600 _____ 52.0
  800 _____ 27.2

The first section of this example shows the weight loss of an "A" residue sample as a function of the temperature to which the sample is heated. The second section shows that the moisture adsorbing characteristics of the residue are lost as the temperature of heat treatment is increased. This behavior is typical of other commercial adsorbents, that is, heating reduced the capacity of the adsorbent for an adsorbate.

*Example 10 (tests of residue "B").*—The pore size distribution of two samples of the white "B" residue prepared as described in Example 7, was determined using nitrogen adsorption. A commercial adsorbent is included for comparison.

PORE RADIUS SURFACE AREA (M.²/G.M.) CONTRIBUTED BY PORES LARGER THAN INDICATED RADIUS

| (Angstroms) | Sample I | Sample II | Commercial adsorbent Linde Molecular Sieve 5A |
|---|---|---|---|
| 107 | 0.30 | 0.44 | 0.04 |
| 82 | 0.43 | 1.0 | 0.09 |
| 55 | 0.70 | 2.0 | 0.17 |
| 49 | 0.92 | 2.9 | 0.34 |
| 37 | 1.6 | 4.9 | 0.71 |
| 34 | 2.3 | 7.4 | 1.3 |
| 29 | 3.0 | 10 | 2.2 |
| 22 | 4.4 | 16 | 5.8 |
| 15 | 9.0 | 42 | 14.4 |
| 12 | 15 | 55 | 25.3 |
| 10 | 21 | 68 | 35.0 |
| 9.7 | 32 | 93 | 46.0 |
| 0 | 202 | 240 | 688.0 |

*Example 11 (tests of residue "A").*—10 gm. samples of the "A" residue, prepared as described in the first paragraph of Example 5, were heated at various temperatures and the ignition loss and reflectance measured.

| Temp. of heating, ° C. | Percent Ignition loss | Reflectance |
|---|---|---|
| 400 | 13.5 | 77.1 |
| 700 | 15.0 | 80.0 |
| 900 | 15.6 | 85.8 |

This shows that the G.E. reflectance of the "A" residue may be increased by heating.

*Example 12 (gas drying efficiency).*—The graph of the accompanying drawing shows a comparison of the drying efficiency of the "A" and "B" residues, and of two commercial drying agents, namely, activated alumina and calcium sulphate ("Drierite"). All of the samples shown in this graph were originally dried at 200° C. and were then exposed to a 75% relative humidity atmosphere for varying periods of time, with determination of the percent moisture in the sample after successive intervals of time. This graph shows the rapid rate of water pick up initially as faster for both the "A" and "B" residues than for the two commercial desiccants.

We claim:

1. The method of producing a silica coating paper pigment which comprises treating calcined kaolin clay with hot dilute acid selected from a member of the group consisting of phosphoric acid and a mixture of phosphoric acid and sulfuric acid to extract a substantial amount of alumina from the calcined clay, the amount of phosphoric acid in the hot dilute acid being at least approximately equal to the alumina content of the clay and the total amount of hot dilute acid being in sufficient excess to keep the dissolved aluminum salts in solution, separating the resulting acid solution from the silica residue to produce a silica product containing alumina of the calcined clay and phosphoric acid in combined form and clay impurities insoluble in dilute acid but soluble in concentrated sulfuric acid, said silica products having an acid surface, a plate-like structure and a particle size distribution similar to that of the clay treated, and neutralizing the silica product with an alkaline to form a silica product having an alkaline surface.

2. The purified silica product having an alkaline surface produced according to the method of claim 1.

3. The coating pigment of claim 2 containing from about 3% to about 15% alumina and from about 1% to about 6% of the combined phosphoric acid as $P_2O_5$.

4. The method of producing a highly purified silica product which comprises treating calcined kaolin clay with hot dilute acid selected from a member of the group consisting of phosphoric acid and a mixture of phosphoric acid and sulfuric acid to extract a substantial amount of alumina from the calcined clay, the amount of phosphoric acid in the hot dilute acid being at least approximately equal to the alumina content of the clay and the total amount of hot dilute acid being in sufficient excess to keep the dissolved aluminum salts in solution, separating the resulting acid solution from the silica residue to produce a silica product containing alumina of the calcined clay and phosphoric acid in combined form and clay impurities insoluble in dilute acid but soluble in concentrated sulfuric acid, said silica products having an acid surface, a plate-like structure and a particle size distribution similar to that of the clay treated, treating the silica residue with hot concentrated sulfuric acid to effect a further removal of impurities therefrom and to produce a white silica product of a plate-like structure, and a particle size distribution similar to that of the clay treated, said particle having an acid surface, and separating the acid solution from the white silica product.

5. A purified silica product of high brightness, high surface area and plate-like structure, produced by the process of claim 4.

6. The method according to claim 4 in which the white silica product is neutralized with alkali to form a silica product having an alkaline surface.

References Cited by the Examiner
UNITED STATES PATENTS

| | | | |
|---|---|---|---|
| 1,796,107 | 3/1931 | Jonas et al. | 252—450 |
| 2,398,825 | 4/1946 | Funsten | 252—450 |
| 2,485,626 | 10/1949 | Mills | 252—450 |
| 2,579,576 | 12/1951 | Hickey | 252—250 |
| 2,967,156 | 1/1961 | Talvenheimo | 252—450 |
| 2,974,054 | 3/1961 | Beamesderser | 252—450 |

OTHER REFERENCES

"Clay and Clay Technology," Bulletin 169 (1955), State of California Dept. of Natural Resources, p. 319.

TOBIAS E. LEVOW, *Primary Examiner.*

S. E. MOTT, *Assistant Examiner.*